United States Patent
Chiadini et al.

(10) Patent No.: US 12,084,094 B2
(45) Date of Patent: Sep. 10, 2024

(54) VEHICLE LIGHT MANAGEMENT DEVICE, ASSOCIATED VEHICLE AND METHOD

(71) Applicant: ALSTOM Transport Technologies, Saint-Ouen-sur-Seine (FR)

(72) Inventors: Luca Chiadini, Fretin (FR); Damien Faurois, Villeneuve d'Ascq (FR); Jean-Pierre Scaramuzzino, Warlaing (FR); Bertrand De-Colombel, Paris (FR); Gopi Ethirajalu, Aulnoy-lez-Valenciennes (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 0 days.

(21) Appl. No.: 17/451,458

(22) Filed: Oct. 19, 2021

(65) Prior Publication Data
US 2022/0119017 A1    Apr. 21, 2022

(30) Foreign Application Priority Data
Oct. 21, 2020    (FR) .................................. 20 10778

(51) Int. Cl.
*H05B 47/10* (2020.01)
*B60Q 3/43* (2017.01)
(Continued)

(52) U.S. Cl.
CPC .............. *B61D 29/00* (2013.01); *B60Q 3/43* (2017.02); *B60Q 3/47* (2017.02)

(58) Field of Classification Search
CPC .... H05B 47/105; H05B 47/115; B60Q 1/085; B60Q 1/50; B60Q 1/1423; B60Q 3/43; B60Q 3/47; B61D 29/00
See application file for complete search history.

(56) References Cited

U.S. PATENT DOCUMENTS 5,176,082 A * 1/1993 Chun ....................... B61B 1/02
                                                    105/341.5
2007/0265891 A1* 11/2007 Guo ...................... G06Q 10/02
                                                    705/5
(Continued)

FOREIGN PATENT DOCUMENTS

CN    209938600 U    1/2020
EP    2423014 A1    2/2012
(Continued)

OTHER PUBLICATIONS

French Search Report issued for French Patent Application No. FR 2010778, dated Jul. 11, 2021 in 2 pages.

*Primary Examiner* — Tung X Le
(74) *Attorney, Agent, or Firm* — Knobbe, Martens, Olson & Bear, LLP (57) ABSTRACT

The invention relates to a light management device for a vehicle, in particular a railway vehicle, the vehicle comprising at least one car. The device comprises:
  at least one light source, the at least one light source emitting light radiation with at least one optical characteristic,
  at least one sensor selected from a sensor for measuring a passenger density aboard the vehicle, such as an axle load sensor, a vehicle position sensor, and/or a clock,
  a control unit connected to the at least one sensor, and to the at least one light source, the control unit being configured to control the at least one optical characteristic of the light radiation based on a measurement of the at least one sensor.

13 Claims, 4 Drawing Sheets

(51) Int. Cl.
*B60Q 3/47* (2017.01)
*B61D 29/00* (2006.01)

(56) References Cited

U.S. PATENT DOCUMENTS

| | | | | |
|---|---|---|---|---|
| 2008/0106599 A1* | 5/2008 | Liu | ............... | G06V 40/10 |
| | | | | 348/143 |
| 2012/0206050 A1* | 8/2012 | Spero | ............... | B60Q 1/1423 |
| | | | | 315/152 |
| 2015/0262006 A1* | 9/2015 | Yomogida | ............... | G06Q 30/0272 |
| | | | | 705/14.62 |
| 2016/0247101 A1* | 8/2016 | Agrawal | ............... | G06V 20/59 |
| 2019/0119970 A1* | 4/2019 | Erlacher | ............... | G07C 9/00 |
| 2019/0196494 A1* | 6/2019 | Kanehara | ............... | G06V 40/103 |
| 2019/0381860 A1 | 12/2019 | Credo et al. | | |
| 2020/0102187 A1* | 4/2020 | Pahlke | ............... | B66B 5/0012 |
| 2021/0405195 A1* | 12/2021 | Uchimura | ............... | G01S 17/894 |

FOREIGN PATENT DOCUMENTS

| | | | |
|---|---|---|---|
| EP | 2444294 | A1 | 4/2012 |
| EP | 3219548 | A1 | 9/2017 |
| FR | 2921603 | A1 | 4/2009 |
| JP | 2001-39210 | A | 2/2001 |
| WO | 2015/130571 | A1 | 9/2015 |

\* cited by examiner

FIG.4

VEHICLE LIGHT MANAGEMENT DEVICE, ASSOCIATED VEHICLE AND METHOD

CROSS-REFERENCE TO RELATED APPLICATION

This application claims priority to French Patent Application No. FR 20 10778 filed on Oct. 21, 2020, which is hereby incorporated by reference.

TECHNICAL FIELD

In a first aspect, the present invention relates to a light management device for a vehicle, in particular a railway vehicle.

The railway vehicle is, for example, a train, a tram or a metro. Alternatively, the vehicle is a bus or coach.

BACKGROUND

Most railway vehicle lighting devices are rather basic in design. They include a control unit that controls one or more light sources located inside the passenger compartment. Generally, light control is binary (active or inactive lighting) and is carried out manually by the driver or by the on-board staff. Other more sophisticated devices include, for example, one or more light sensors inside the passenger compartment to automatically control the lighting according to the ambient light measurement. Most of the time, when the outdoor light level falls below a first predefined threshold, the lighting is activated. Conversely, as soon as the brightness exceeds predefined thresholds, the lighting is adjusted in intensity according to predefined levels.

The features of current light management devices are limited and not very versatile.

One objective of the invention is to propose a light management device for a vehicle, in particular a railway vehicle, which makes it possible to improve the travelling conditions of passengers, in particular by improving their comfort and their feeling of safety and by providing them with useful information for their journey by means of the lighting.

SUMMARY

To this end, the invention has as its object a light management device for a vehicle, in particular a railway vehicle, the vehicle comprising at least one car extending mainly in a longitudinal direction, the device comprising:
- at least one light source, the at least one light source emitting light radiation with at least one optical characteristic,
- at least one sensor selected from a sensor for measuring a passenger density aboard the vehicle, such as an axle load sensor, a vehicle position sensor, and/or a clock,
- a control unit connected to the at least one sensor, and to the at least one light source, the control unit being configured to control the at least one optical characteristic of the light radiation based on a measurement of the at least one sensor.

Such a light management device makes it possible to improve passenger comfort, in particular by using the lighting as a vector of information (information relating to the position of the vehicle on the route, information on which cars of the railway vehicle have a lower passenger density, etc.).

According to particular embodiments, the control device comprises one or more of the following features taken in isolation or in any combination that is technically possible:
- the device comprises at least two sensors selected from a sensor for measuring a density of passengers aboard the vehicle, a sensor for measuring the position of the vehicle, and/or a clock, the control unit being configured to monitor a first characteristic of the light radiation as a function of a measurement of the first sensor, and a second characteristic of the light radiation as a function of a measurement of the second sensor;
- the or each car has at least one axle, the device comprising for the at least one axle of the car, an axle load sensor connected to the at least one axle, the load sensor being configured to measure a load carried by said axle, the control unit being connected to the axle load sensor and to the at least one light source, the control unit being configured to control the at least one optical characteristic of the light radiation as a function of the measured axle load;
- the at least one optical characteristic of the light radiation is selected from: the wavelength of the light radiation, the luminous flux of the light radiation, and the colour temperature of the light radiation;
- the or each car comprises at least one passenger compartment, the at least one light source being intended to illuminate the interior of the at least one passenger compartment;
- the device (18) comprises:
  - a plurality of sensors for measuring the density of passengers on board the vehicle suitable for calculating a density of passengers per zone in the vehicle, such as axle load sensors to be connected to one of the vehicle's axles each,
  - a plurality of light sources grouped into at least two groups of light sources, each group being associated with a respective zone of the vehicle and each source of the same group of sources emitting light radiation with the same optical characteristic, the control unit being configured to control the optical characteristic of the radiation of the light sources of the same group of light sources as a function of the measured passenger density for the corresponding zone;
- the device comprises a vehicle position sensor configured to detect that the vehicle has reached a predetermined position, the control unit being configured to control the at least one optical characteristic of the radiation from the at least one light source so that said at least one light source emits light radiation whose at least one optical characteristic has a predetermined value associated with said position;
- the device comprises a clock, the clock providing a parameter representative of time, the control unit (30) being configured to vary the value of the at least one optical characteristic of the radiation of the at least one light source as a function of said parameter according to a predetermined time variation curve of said value, the time variation curve preferably being characteristic of a human circadian cycle or the variation curve is a sinusoidal curve characteristic of human respiration.

In a second aspect, the invention relates to a vehicle, in particular a railway vehicle, comprising at least one carriage, the at least one carriage comprising at least one light management axle as described above.

Finally, the invention relates according to a third aspect to a method for managing the light of a vehicle, in particular a railway vehicle, the vehicle comprising at least one car, the method comprising the following steps:
- measuring a density of passengers aboard the vehicle and/or a position of the vehicle and/or a parameter representative of time,
- controlling at least one optical characteristic of a light beam of at least one light source using the measurement of the axle load and/or the measurement of the position of the vehicle and/or of the parameter representative of time.

BRIEF DESCRIPTION OF THE DRAWINGS

Other characteristics and advantages of the invention will become apparent upon reading the following description, given only as an example and referencing the attached drawings, in which.

DETAILED DESCRIPTION OF EMBODIMENTS

Figure 1:
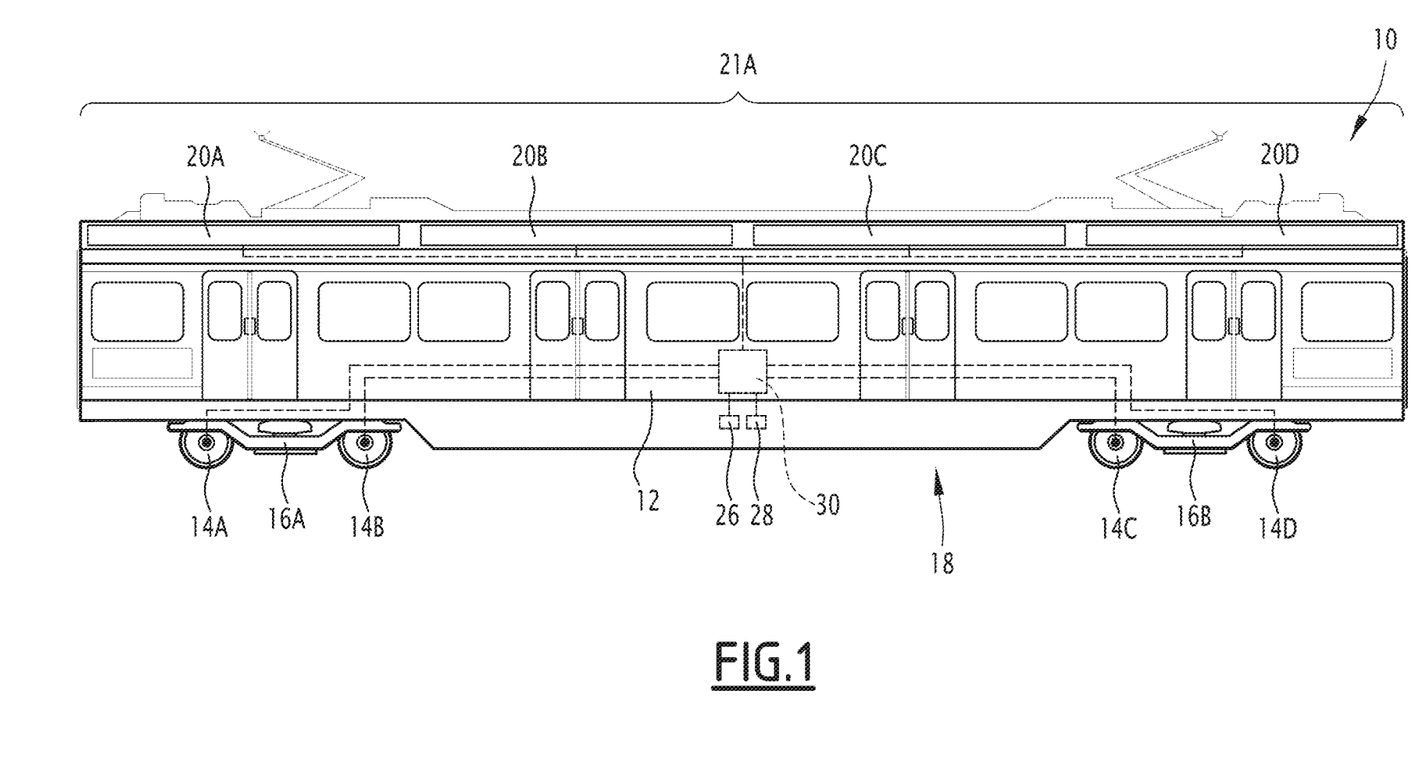
FIG. 1 is a general schematic view of a railway vehicle light management device according to a first embodiment of the invention.

FIG. 1 shows a car 10 of a vehicle according to the invention. In the example shown in FIG. 1, the vehicle is a railway vehicle.

The railway vehicle is, for example, a train, a tram or a metro. Alternatively, the vehicle is a bus or coach.

In the example shown in FIG. 1, the railway vehicle typically comprises a plurality of interconnected cars 10 extending mainly in a longitudinal direction.

Each car 10 comprises at least one passenger compartment 12 for the accommodation of seated and/or standing passengers. To this end, each passenger compartment 12 comprises a plurality of seats (not shown) attached to a floor of the car 10.

Each car 10 comprises at least one axle 14A, 14D, preferably at least two axles 14A, . . . , 14D.

For example, the axles 14, . . . , 14D are attached to a bogie 16A, 16B.

Figure 2:
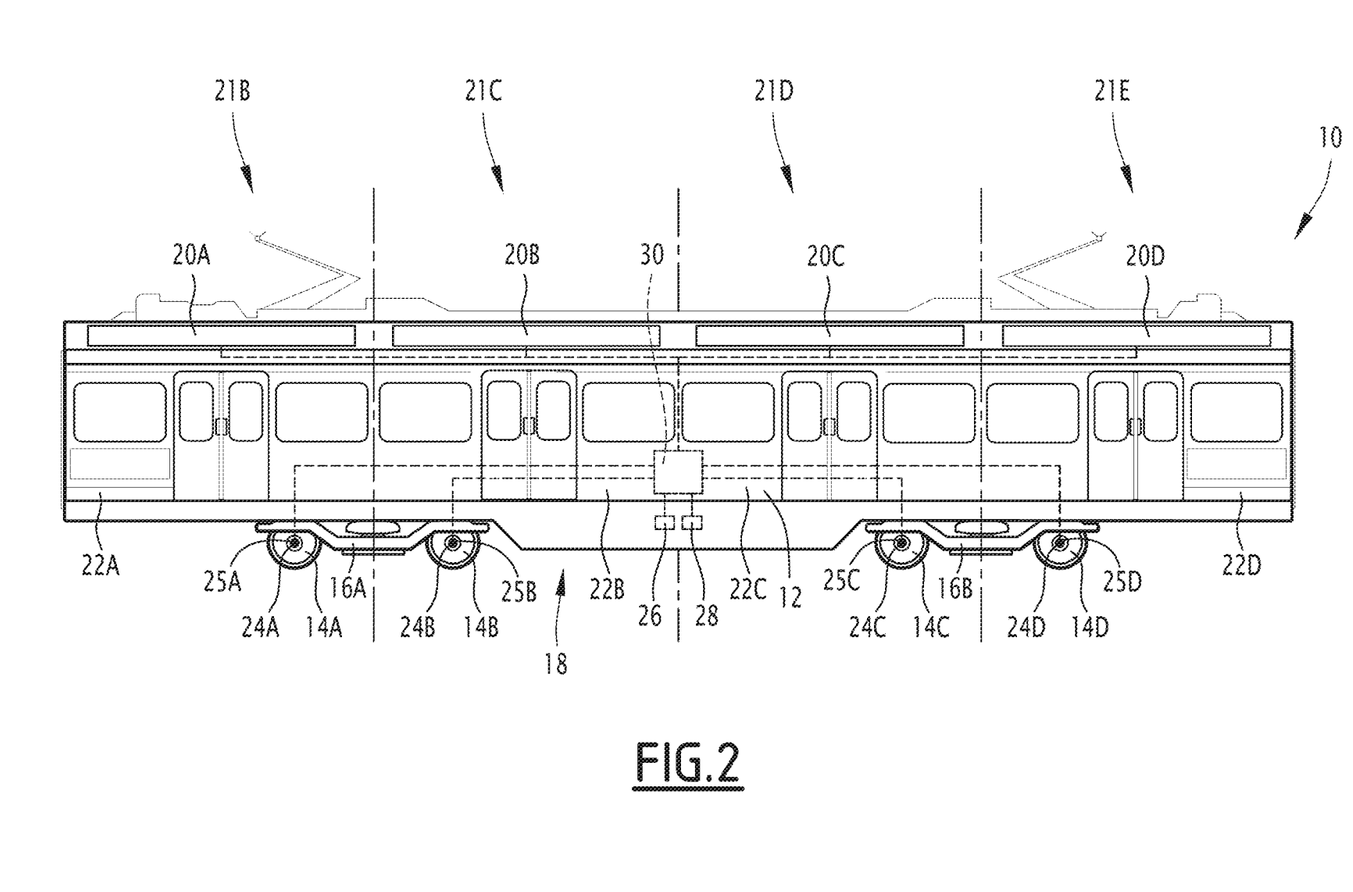
FIG. 2 is a general schematic view of a railway vehicle light management device according to a second embodiment of the invention.
Figure 3:
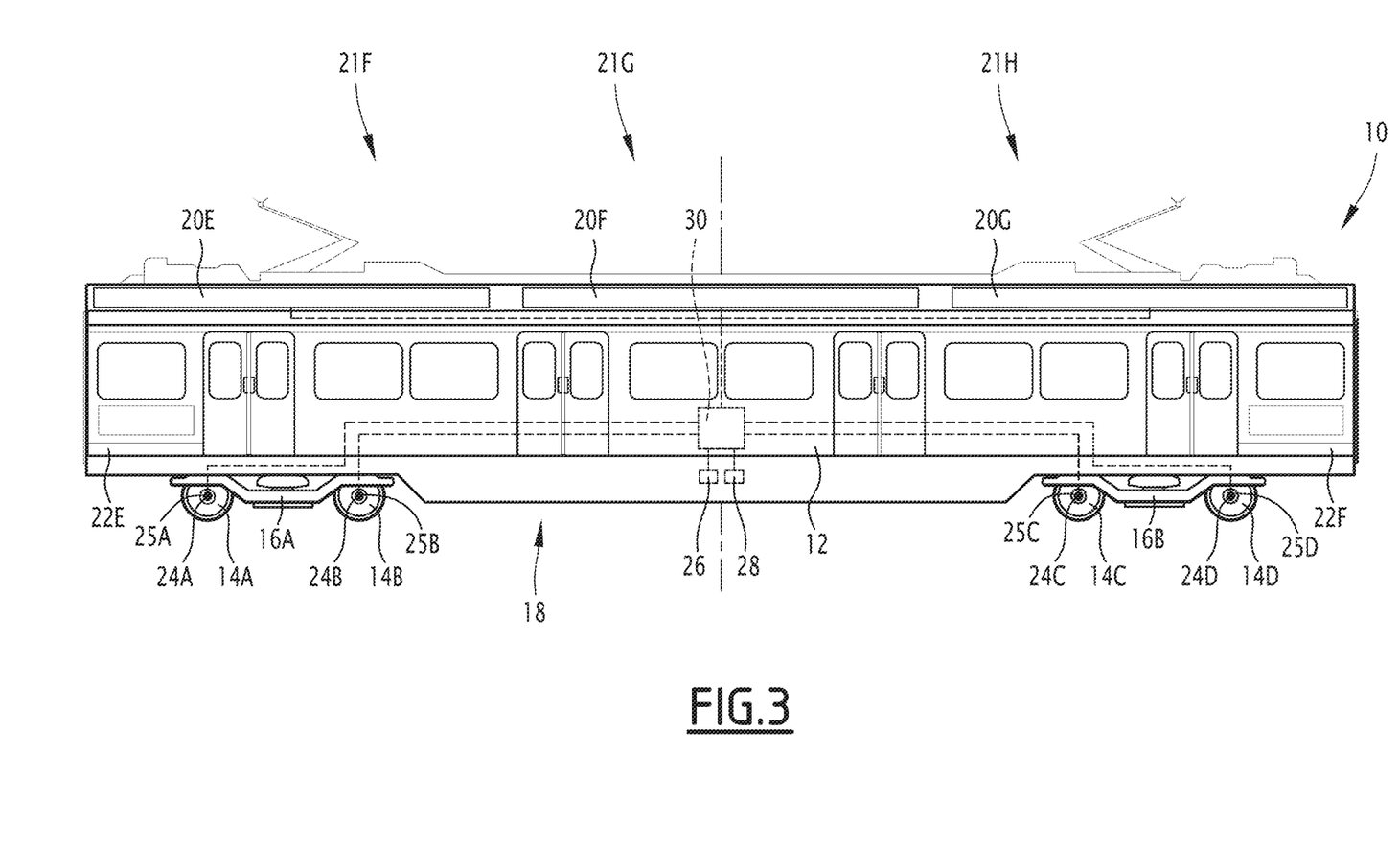
FIG. 3 is a general schematic view of a railway vehicle light management device according to a third embodiment of the invention.

In the example embodiments shown in FIGS. 1 to 3, the carriage comprises two bogies 16A, 16B each comprising two axles 14A, . . . , 14D.

The car 10 also includes a light management device 18.

The device 18 according to the invention comprises at least one light source 20A, . . . , 20G emitting light radiation with at least one optical characteristic.

Preferably, the device 18 comprises a plurality of light sources 20A, . . . , 20G.

The light source(s) 20A, . . . , 20G comprise(s), for example, at least one light-emitting diode (LED) board, at least one spotlight or a bulb comprising at least one light-emitting diode.

The light source(s) 20A, . . . , 20G are preferably intended to illuminate the interior of the passenger compartment 12.

Alternatively or additionally, at least one of the light sources 20A, . . . , 20G is preferably intended to provide complementary lighting to the main lighting of the passenger compartment.

The light source(s) 20A, . . . , 20G are for example attached at the ceiling level of the car 10, at the floor level of the car 10, in a side panel, in a seat, in an armrest, in an aisle, in a staircase, in a shelf, around the entrance and exit doors, etc.

Alternatively or additionally, at least one light source is attached so that the light radiation is directed predominantly towards the outside of the car 10.

Alternatively or additionally, at least one light source 20A, . . . , 20G is for example attached inside the at least one passenger compartment and visible from outside the at least one passenger compartment 12.

Alternatively or additionally, at least one light source 20A, . . . , 20G is attached to the outside of the at least one passenger compartment on an outer wall of the at least one car 10.

For the sake of simplicity, in FIG. 1, the device 18 comprises four light sources 20A, . . . , 20G shown on the ceiling of the car 10.

Preferably, the light sources 20A, . . . , 20G are grouped together to form at least one group of light sources, preferably a plurality of groups 21A, . . . , 21H of light sources 20A, . . . , 20G.

The light sources 20A, . . . , 20G of the same group 21A, . . . , 21H of light sources 20A, 20G emit light radiation with the same optical characteristic(s).

Preferentially, the vehicle is divided into a plurality of lighting zones 22A, . . . , 22F.

Preferentially, as it can be seen in FIGS. 2 and 3, the passenger compartment 12 of each car 10 of the vehicle is divided into a plurality of lighting zones 22A, . . . , 22F, each lighting zone 22A, . . . , 22F being associated with a group of light sources (see FIGS. 2 and 3).

The optical characteristic of light radiation is, for example, the wavelength of the light radiation.

The wavelength of the light radiation from the light source is typically in the visible range, i.e. the wavelength is between 400 nm and 700 nm.

The optical characteristic of the light radiation is, for example, the luminous flux of the light radiation.

Luminous flux is the amount of light emitted in all directions.

Alternatively, the optical characteristic of the radiation is a light intensity.

Light intensity is the amount of light emitted in a given direction.

The optical characteristic is, for example, the colour temperature, also called correlated colour temperature (CCT).

Colour temperature is the temperature of an incandescent black body that would give an equivalent calorimetric light.

Typically, the colour temperature is between 2,800° K and 6,500° K.

The device 18 according to the invention comprises at least one sensor 24A, . . . , 26, 28 selected from a sensor 25A, . . . , 25D, for measuring a passenger density aboard the vehicle, such as an axle load sensor 24A, . . . , 24D, a vehicle position sensor 26, and/or a clock 28.

Preferentially, the sensors for measuring the passenger density are able to calculate a passenger density per zone in the vehicle, and in particular per lighting zone of the passenger compartment.

In the present invention, the clock 28 is considered to be a sensor configured to acquire at least one parameter representative of time, such as time and/or date.

In the examples of FIGS. 1 to 3, the device 18 comprises four axle load sensors 24A, . . . , 24D, a railway vehicle position sensor 26, and a clock 28.

Alternatively or additionally, the sensors for measuring the passenger density 25A, . . . , 25D comprise cameras suitable for being carried in the vehicle and for calculating a passenger density per zone in the vehicle, and preferentially per zone in the car.

The device 18 according to the invention further comprises a control unit 30 connected to the at least one sensor 24A, . . . , 24D, 26, 28 and to the at least one light source 20A, 20G. The control unit 30 is configured to control the at least one optical characteristic of the light radiation based on a measurement from the at least one sensor 24A, . . . , 24D, 26, 28.

According to an embodiment, the device 18 comprises at least two sensors 24A, 24D, 26, 28 selected from an axle load sensor 24A, . . . , 240, a railway vehicle position sensor 26, and/or a clock 28.

The control unit 30 is then configured to monitor a first characteristic of the light radiation based on a measurement of the first sensor 24A, . . . , 240, 26, 28 and a second characteristic of the light radiation based on a measurement of the second sensor 24A, . . . , 24C, 26, 28.

Advantageously, the device 18 comprises for each axle 14A, . . . , 14D of the at least one vehicle 10 an axle load sensor 24A, . . . , 24D connected to the axle 14A, . . . , 14D. The sensor 24A, . . . , 24D is configured to measure a load carried by the axle 14A, . . . , 14D.

In a known way, the load sensor 24A, . . . , 24D transforms the axle load into an electrical signal proportional to the measured load.

Preferably, the device 18 comprises at least one load sensor 24A, . . . , 24D associated with each of the lighting zones 22A, . . . , 22F. More particularly, the at least one load sensor 24A, . . . , 24D is attached to the axle 14A, . . . , 14D located under said associated lighting zone 22A, . . . , 22F and which supports said associated lighting zone 22A, . . . , 22F.

FIG. 1 shows a first embodiment of the invention. The device 18 comprises a single group 21A of light sources 20A, . . . , 20D grouping all the light sources in the passenger compartment 12. The lighting zone is thus formed by the entire passenger compartment 12.

The car 10 has four axles 14A, . . . , 14D. The device 18 according to the invention thus comprises four load sensors 24A, . . . , 24D connected to each of the axles 14A, . . . , 14D of the car 10 and to the control unit 30.

The control unit 30 is configured to control the optical characteristic of the radiation of the light sources 20A, . . . , 20D of the single group 21A of light sources as a function of, for example, the average load or the sum of the loads measured by the four load sensors 24A, . . . , 24D.

FIG. 2 illustrates a second embodiment of the invention in which the passenger compartment 12 is divided into four lighting zones 22A, . . . , 22D.

The device 18 comprises four groups 21B, . . . , 21E of light sources associated respectively with each of the lighting zones 22A, . . . , 22D. For simplicity, in the example shown in FIG. 2, each group 21B, . . . , 21E comprises only one light source 20A, . . . , 20D respectively.

The control unit 30 is then configured to control the at least one optical characteristic of the light radiation of each group 21B, . . . , 21E as a respective function of the load sensor(s) 24A, . . . , 24D arranged under each of the lighting zones 22A, . . . , 22D.

Thus, in the example shown in FIG. 2, the at least one optical characteristic of the light source group 21B of the lighting zone 22A is controlled as a function of the load measured by the load sensor 24A connected to the axle 14A arranged under the lighting zone 22A of the passenger compartment 12.

Alternatively, for all the presented embodiments, the axle load sensors are replaced or supplemented by other types of passenger density measurement sensors, such as cameras suitable for determining a passenger density for each lighting zone, and the control unit 30 is then configured to control the at least one optical characteristic of the light radiation of each group 21B, . . . , 21E, such as colour and/or luminous flux as a function of the passenger densities measured for each lighting zone by the set of passenger density measurement sensors.

Such an embodiment allows, via the measurements made by the passenger density sensors, to independently control the groups of light sources according to the density of passengers in each lighting zone in order, for example, to visually indicate to the passengers the less dense zones, or to encourage them to be more vigilant in the denser zones.

FIG. 3 shows a third embodiment of the invention.

The passenger compartment 12 is divided into a first and second lighting zone 22E, 22F.

The device 18 according to the invention comprises first, second and third groups 21F, 21G, 21H of light sources 20E, 20F, 20G. The first and third groups 21F, 21H of sources are associated with the first and second lighting zones 22E, 22F respectively.

The second group 21G of sources 20F is a transitional group arranged in the longitudinal direction between the first group 21F and the third group 21H of sources 20E, 20G.

The control unit 30 is configured to control the at least one optical characteristic of the light output of the first group 21F of sources 20E as a function of the load measured by the load sensors 24A, 24B of the first bogie 16A. For example, the control is performed according to the average of the load measured by the two load sensors 24A, 24B or according to the sum of the loads measured by the two load sensors 24A, 24B.

The first group 21F of sources 20E emits light radiation with a first value of at least one optical characteristic.

The at least one optical characteristic of the light radiation of the third group 21H of sources 20G is similarly controlled by the control unit 30 as a function of the load sensors 24C, 24D of the second bogie 16B.

The third group 21H of sources 20G emits light radiation with a third value of at least one optical characteristic, different from the first value of the at least one optical characteristic.

The second group 21G of sources 20F emits light radiation with a first value of at least one optical characteristic.

The control unit 30 is configured to control the second value of the at least one optical characteristic such that the second value is an intermediate value between the first value and the third value.

For example, the second value is a linearly interpolated value between the first value and the third value.

In the example below, the at least one optical characteristic is, for example, colour temperature and/or luminous flux.

Thus, the light sources 20E, 20F, 20G emit light with a continuous optical characteristic from one source to another, which improves the overall aesthetic appearance of the car lighting 10.

Preferably, in all of the embodiments described above, the control unit 30 is configured to control the colour temperature and luminous flux of the radiation of the light sources 20A, ..., 20G in accordance with the load measured by the load sensors 24A, ..., 24D.

For example, when the axle load is high, i.e. when the density of passengers in the associated lighting zone is high, the light output has a cool colour temperature (e.g. equal to or greater than 5,000 K) and a high luminous flux (e.g. between 600 and 1,000 lm/m).

Conversely, when the axle load is low, i.e. when the density of passengers in the associated lighting zone is low, the light radiation has a warm colour temperature (e.g. between 3,000 K and 4,000 K) and a low luminous flux (e.g. between 300 and 600 lm/m).

Thus, the optical characteristic of the light radiation provides information to the passenger about the density of passengers inside the passenger compartment 12, and more specifically about a lighting zone. The passenger can then move to a less dense area, for example to the front or rear of the railway vehicle.

The information can also be used by passengers on the platform who, when the train arrives at the station, can direct themselves to the cars with the lowest passenger density. This also makes it easier for passengers to get on and off and minimises downtime.

In addition, this also helps to balance the load on all axles of the railway vehicle.

Finally, it has been observed that certain optical characteristics of the light radiation improve the comfort of the passenger. Thus, in a passenger-dense environment, stronger and cooler lighting improves the passenger's sense of well-being and safety. The same lighting in a low-density environment is perceived as aggressive and uncomfortable by passengers.

On the contrary, lower and warmer lighting in a low-passenger-density environment improves the passenger's sense of well-being.

The position sensor 26 is for example a GPS (global positioning system) position sensor.

Alternatively, the position sensor 26 is, for example, a sensor for interacting with positioning terminals on the railway line to determine the position of the railway vehicle on the line.

In the examples shown in FIGS. 1 to 3, the position sensor is shown schematically at the car 10. However, the position sensor 26 is preferably attached to an outer wall of the railway vehicle's power car or of a car 10 of the railway vehicle.

The railway vehicle travels on a railway line. The railway line comprises a plurality of stations at which the railway vehicle stops and passengers get on and off. The railway line is divided into a number of sections, each section being delimited by two stations. The terminus is the last station on the railway line.

Preferably, the position sensor 26 continuously measures the position of the railway vehicle along the railway line.

According to an embodiment, the position sensor 26 is configured to detect that the railway vehicle has reached a predetermined position.

The control unit 30 is then configured to control the at least one optical characteristic of the radiation of the at least one light source 20A, ..., 20G so that said at least one light source 20A, ..., 20G emits light radiation whose at least one optical characteristic has a predetermined value associated with said position.

For example, the predetermined position of the railway vehicle corresponds to a position outside a tunnel or a position inside a tunnel.

For example, the optical characteristic is the luminous flux. The control unit 30 controls the luminous flux of the light radiation so that said flux inside the tunnel is greater than the luminous flux of the radiation outside the tunnel.

According to another embodiment, the predetermined position of the railway vehicle corresponds to a position of the railway vehicle on its railway line, or to the position of the railway vehicle at the terminus of the railway line.

The optical characteristic is, for example, the wavelength or the colour temperature.

The control unit 30 is then configured to control the characteristic of the light radiation so that the wavelength and/or colour temperature of the light radiation when the railway vehicle is at the terminus of the railway line is different from that of the radiation when the railway vehicle is travelling on the railway line. For example, the optical characteristic of the light radiation when the vehicle is travelling on the railway line is yellow or white light and the optical characteristic of the light radiation when the vehicle is at the terminus is orange or red light.

Thus, the characteristic of the light radiation informs the passenger of the arrival at the terminus of the railway vehicle and invites the passenger to leave the passenger compartment 12. Similarly, the optical characteristic of the light radiation indicates to passengers on the platform that the railway vehicle is not picking up passengers.

According to another embodiment, the control unit 30 controls the optical characteristic of the light radiation of the light sources 20A, ... 20G as a function of the position of the railway vehicle on the railway line.

For example, the rail line of the railway vehicle has five stations and four sections. For each of the sections, the optical characteristic and more particularly the value of the optical characteristic, such as the wavelength of the light radiation, i.e. the colour of the light radiation, is for example different from one section to another.

This means that the passenger knows where he or she is on the railway line at all times, and in particular in which section he or she is. The light radiation provides location information to the passenger.

Alternatively or additionally, the control unit 30 is configured to monitor at least one optical characteristic of the light radiation arriving at or departing from each of the stations on the railway line using the position detected by the position sensor 26. For example, on arrival at a station, the luminous flux of at least one group of light sources 20A, ..., 20G is increased in order to alert passengers of the coming arrival at the station and to guide them towards the exit.

Alternatively or additionally, the control unit 30 is configured to vary the value of the at least one optical characteristic of the radiation of the at least one light source 20A, ..., 20G as a function of a parameter representative of time provided by the clock 28 according to a predetermined time variation curve of said value.

For example, the time variation curve is characteristic of a human circadian cycle.

The optical characteristic is for example the colour temperature.

The circadian rhythm comprises all the cyclical biological processes in the human body that last approximately 24 hours. The circadian rhythm includes the human body's sleep-wake rhythm.

Figure 4:
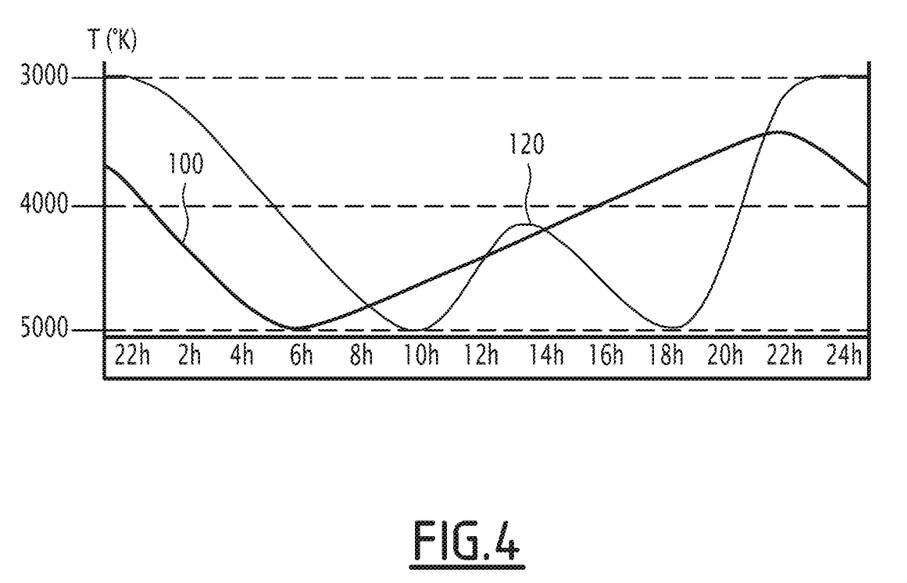
FIG. 4 is an example of a circadian rhythm used to control the characteristic of light radiation by a device according to one embodiment of the invention.

FIG. 4 shows an example circadian rhythm. The curve 100 shows the variation in the average sleep requirement level for a human over the course of the day. In the example in FIG. 4, the average sleep requirement is highest at around 10 pm. The curve 120 shows a possible variation during the day for the colour temperature of the optical radiation of the light source group(s). The colour temperature of this optical radiation is in this example cooler during the day at times when passengers are most active, and warmer in the evening and early morning, thus providing greater comfort to passengers.

In this example, the parameter representative of time provided by the clock 28 includes the time of day and/or the date.

This improves passenger comfort by adapting the optical characteristics of the light radiation to the biological state of the human body.

Alternatively or additionally, the control unit 30 is configured to vary the value of the at least one optical characteristic of the radiation of the at least one light source 20A, ..., 20G as a function of a parameter representative of time provided by the clock 28 and of a position parameter measured by the position sensor 26, according to a predetermined time variation curve associated with the combination of both parameters.

For example, the optical characteristic is the colour of the light source 20A, ..., 20G. The unit 30 controls the colour variation of the light source to give an indication to facilitate the boarding and disembarking of passengers in the car 10.

Alternatively or additionally, the control unit 30 is configured to monitor at least one characteristic of the light output of at least one of the light sources 20A, 20G as a function of the average outdoor temperature.

For example, the outdoor temperature is a monthly average outdoor temperature provided by a chart that associates each month of the year with an average outdoor temperature.

Alternatively, the outdoor temperature parameter is measured by a thermometer located outside the railway vehicle.

Preferably, the optical characteristic of the light radiation is the colour temperature. For example, the colour temperature of the light radiation is inversely proportional to the outdoor temperature: Light radiation has a cold colour temperature (>4,000 K) when the outdoor temperature is high (e.g. in summer). Conversely, light radiation has a warmer temperature (<4,000 K) when the outside temperature is lower (e.g. in winter).

Alternatively or additionally, the curve of variation of the value of the at least one optical characteristic of the radiation is a sine curve characteristic of human respiration.

The frequency of the sine curve is preferably substantially equal to the human respiratory rate at rest. The frequency is for example between 10 and 20 cycles per minute.

This improves passenger comfort and has a calming effect on passengers.

A method of managing the light of a railway vehicle using a device as described above will now be described.

The method according to the invention firstly comprises a step of measuring an axle load and/or a position of the railway vehicle and/or a parameter representative of time with respectively at least one sensor 24A, ..., 24D, 26, 28 selected from an axle load sensor 24A, ..., 24D and/or a position sensor 26 of the railway vehicle and/or a clock 28.

The method comprises a step of controlling at least one optical characteristic of a light beam of at least one light source 20A, ..., 20D using the measurement of the axle load and/or the measurement of the position of the railway vehicle and/or of the parameter representative of time.

With reference to FIG. 1, a first embodiment of a method according to the invention is described.

The method comprises a step of measuring the axle load using the four load sensors 24A, ..., 24D attached to the four axles 14A, ..., 14D of the car 10 respectively.

The monitoring step comprises monitoring the optical characteristic of the light sources 20A, ..., 20D grouped in a single group 21A of light sources 20A, ..., 20D according to e.g. the average load or the sum of the loads measured by the four load sensors 24A, ..., 24D.

With reference to FIG. 2, a second embodiment of a method according to the invention is described.

The axle load measurement step is the same as in the first embodiment.

The passenger compartment 12 is divided into a plurality of lighting zones 22A, ..., 22D.

The method then controls the at least one optical characteristic of the light radiation of each group 21B, ..., 21E as a respective function of the load sensors 24A, ..., 24D arranged under each of the lighting zones 22A, ..., 22D.

With reference to FIG. 3, a third embodiment of a method according to the invention is described.

The plurality of light sources is grouped into at least a first, second and third group 21F, 21G, 21H of light sources 20E, 20F, 20G.

The second group 21G is arranged between the first group 21F and the third group 21H in the longitudinal direction.

The control step comprises controlling the value of the at least one optical characteristic of the light radiation of the light source(s) of the second group 21G as a function of the values of the optical characteristics of the light radiation of the light sources of the first and third groups 21F, 21H.

For example, the at least one optical characteristic of the light radiation of the light sources of the second group 21G has an intermediate value with respect to the values of the optical characteristics of the light radiation of the light sources of the first and third groups 21F, 21H.

Preferably, the value of the at least one optical characteristic of the light radiation of the light sources of the second group 21G is a value linearly interpolated between the values of the optical characteristics of the first and third groups 21F, 21H.

Alternatively or additionally, the method comprises providing a parameter representative of time with clock 28, the parameter being representative of time and/or date, the control of the optical characteristic comprising varying the value of the at least one optical characteristic of the radiation of the at least one light source 20A, ..., 20G as a function of said parameter according to a predetermined time variation curve of said value.

For example, the time variation curve is characteristic of a human circadian cycle or the variation curve is a sine curve characteristic of human respiration.

Alternatively or additionally, the method comprises detecting a predetermined position reached by the railway vehicle using a position sensor 26, and controlling at least one optical characteristic of the radiation of the at least one light source 20A, ..., 20G so that said at least one light source 20A, ..., 20G emits light radiation whose at least one optical characteristic has a predetermined value associated with said position.

Thus, the light management device 18 for railway vehicles is particularly advantageous because it allows the light radiation of the light sources 20A, ..., 20G present in the passenger compartment 12 to be used to convey information to the passenger. This information relates in particular to the density of passengers on board, the position of the railway vehicle on the line, the arrival at a station or terminus etc. The device 18 according to the invention also makes it possible to improve the passenger's comfort and their travel experience.

What is claimed is:

1. A light management device for a vehicle, the vehicle comprising at least one car extending mainly in a longitudinal direction and being divided into a plurality of lighting zones, the device comprising:
    a plurality of sensors for measuring a density of passengers on board the vehicle suitable for calculating the density of passengers per each of the plurality of lighting zones,
    a plurality of light sources grouped into at least two groups of light sources, each group being associated with a distinct respective lighting zone of the plurality of lighting zones and each light source of a same group of light sources emitting light radiation with the same optical characteristic,
    a controller connected to each of the sensors for measuring the density of passengers, and to the light sources, the controller being configured to independently control the optical characteristic of the light radiation of the light sources of the same group of light sources based on the passenger density calculated for the corresponding lighting zone.

2. The device according to claim 1, wherein the vehicle comprises a plurality of axles, the plurality of sensors for measuring the density of passengers being formed by a plurality of axle load sensors respectively connected to the axles, each axle load sensor being configured to measure the load carried by the corresponding axle.

3. The device according to claim 1, wherein the at least one optical characteristic of the light radiation is selected from: the wavelength of the light radiation, the luminous flux of the light radiation, the colour temperature of the light radiation.

4. The device according to claim 1, wherein the vehicle comprises at least one passenger compartment, the light sources being intended to illuminate the interior of the at least one passenger compartment.

5. The device according to claim 1, wherein the device comprises a vehicle position sensor configured to detect that the vehicle has reached a predetermined position, the controller being configured to control the at least one optical characteristic of the radiation from the at least one light source so that said at least one light source emits light radiation whose at least one optical characteristic has a predetermined value associated with said position.

6. The vehicle comprising the at least one car, the at least one car comprising a plurality of axles, the vehicle further comprising the device according to claim 1.

7. The vehicle according to claim 6, wherein the vehicle is a railway vehicle.

8. A method for managing the light of a vehicle, which comprises the light management device according to claim 1 and the at least one car, the method comprising:
    measuring the density of passengers aboard the vehicle per zone in the vehicle with the plurality of sensors for measuring the density of passengers,
    controlling the optical characteristic of the light radiation of the light sources of the same group of light sources based on the density of passengers measured for the corresponding zone.

9. The method according to claim 8, wherein the vehicle is a railway vehicle.

10. The device according to claim 1, wherein the vehicle is a railway vehicle.

11. A light management device for a vehicle, the vehicle comprising at least one car extending mainly in a longitudinal direction, the device comprising:
    a plurality of sensors for measuring a density of passengers on board the vehicle suitable for calculating the density of passengers per zone in the vehicle,
    a plurality of light sources grouped into at least two groups of light sources, each group being associated with a respective zone of the vehicle and each light source of a same group of light sources emitting light radiation with the same optical characteristic,
    a controller connected to each of the sensors for measuring the density of passengers, and to the light sources, the controller being configured to control the optical characteristic of the light radiation of the light sources of the same group of light sources based on the passenger density calculated for the corresponding zone,
    wherein the device comprises at least a second sensor selected from a sensor of the position of the vehicle, and/or a clock, the controller being configured to monitor a first characteristic of the light radiation as a function of a measurement of the sensor for measuring the density of passengers on board the vehicle, and a second characteristic of the light radiation as a function of a measurement of the second sensor.

12. A light management device for a vehicle, the vehicle comprising at least one car extending mainly in a longitudinal direction, the device comprising:
    a plurality of sensors for measuring a density of passengers on board the vehicle suitable for calculating the density of passengers per zone in the vehicle,
    a plurality of light sources grouped into at least two groups of light sources, each group being associated with a respective zone of the vehicle and each light source of a same group of light sources emitting light radiation with the same optical characteristic,
    a controller connected to each of the sensors for measuring the density of passengers, and to the light sources, the controller being configured to control the optical characteristic of the light radiation of the light sources of the same group of light sources based on the passenger density calculated for the corresponding zone,
    wherein the device comprises a clock, the clock providing a parameter representative of time, the controller being configured to vary the value of the at least one optical characteristic of the radiation of the at least one light source as a function of said parameter according to a predetermined time variation curve of said value.

13. The device according to claim 12, wherein the time variation curve is characteristic of a human circadian cycle or the variation curve is a sine curve characteristic of human respiration.

* * * * *

UNITED STATES PATENT AND TRADEMARK OFFICE
CERTIFICATE OF CORRECTION

| | | |
|---|---|---|
| PATENT NO. | : 12,084,094 B2 | Page 1 of 1 |
| APPLICATION NO. | : 17/451458 | |
| DATED | : September 10, 2024 | |
| INVENTOR(S) | : Chiadini et al. | |

It is certified that error appears in the above-identified patent and that said Letters Patent is hereby corrected as shown below:

In the Specification

Column 4, Line 26, delete "20A, 20G" and insert -- 20A, . . . , 20G --.

Column 5, Line 13 (approx.), delete "20A, 20G." and insert -- 20A, . . . , 20G. --.

Column 5, Line 18 (approx.), delete "24A, 24D," and insert -- 24A, . . . , 24D, --.

Column 5, Line 19 (approx.), delete "240," and insert -- 24C, --.

Column 5, Line 23, delete "240," and insert -- 24C, --.

Column 9, Line 32, delete "20A, 20G" and insert -- 20A, . . . , 20G --.

Signed and Sealed this
Fourth Day of February, 2025

Coke Morgan Stewart
*Acting Director of the United States Patent and Trademark Office*